US012760595B2

(12) United States Patent

Balbach et al.

(10) Patent No.: US 12,760,595 B2
(45) Date of Patent: Oct. 13, 2026

(54) REFEED STRUCTURE AND ROLL-UP DOOR ASSEMBLY

(71) Applicant: ASI Doors, Inc., Milwaukee, WI (US)

(72) Inventors: George F. Balbach, Lake Bluff, IL (US); Jonathon M. Haggerty, Whitefish Bay, WI (US)

(73) Assignee: ASI Doors, Inc., Milwaukee, WI (US)

( * ) Notice: Subject to any disclaimer, the term of this patent is extended or adjusted under 35 U.S.C. 154(b) by 229 days.

(21) Appl. No.: 18/667,356

(22) Filed: May 17, 2024

(65) Prior Publication Data

US 2024/0384593 A1 Nov. 21, 2024

Related U.S. Application Data

(60) Provisional application No. 63/467,398, filed on May 18, 2023.

(51) Int. Cl.
*E06B 9/58* (2006.01)
*E05D 15/16* (2006.01)

(52) U.S. Cl.
CPC .............. *E06B 9/58* (2013.01); *E05D 15/165* (2013.01)

(58) Field of Classification Search
CPC ... E06B 9/58; E06B 9/581; E06B 9/56; E06B 2009/585; E06B 2009/588; E06B 9/13; E05D 15/165
See application file for complete search history.

(56) References Cited

U.S. PATENT DOCUMENTS 4,884,617 A * 12/1989 Coenraets ............... E06B 9/581 160/310
7,036,549 B2 * 5/2006 Coenraets ................. E06B 9/13 160/271
7,131,481 B2 11/2006 Varley
7,416,014 B2 8/2008 Coenraets
7,665,506 B2 2/2010 Coenraets
8,109,317 B2 * 2/2012 Bostyn .................... E06B 9/581 160/271
8,851,147 B2 * 10/2014 Drifka ....................... E06B 9/13 160/273.1
9,493,984 B2 11/2016 Casey
11,708,722 B2 * 7/2023 Beggs ....................... E06B 9/13 160/270
2005/0211397 A1 * 9/2005 Coenraets ............... E06B 9/582 160/271
2005/0211398 A1 * 9/2005 Coenraets ............... E06B 9/581 160/273.1
2006/0248819 A1 * 11/2006 Coenraets ................. E06B 9/13 52/202
2008/0035282 A1 * 2/2008 Coenraets ................. E06B 9/13 160/272

(Continued)

FOREIGN PATENT DOCUMENTS

BE 1017205 A6 * 4/2008 ............... E06B 9/58
EP 0272733 A1 * 6/1988 ............ E06B 9/581

*Primary Examiner* — Beth A Aubrey
(74) *Attorney, Agent, or Firm* — Amundsen Davis, LLC

(57) ABSTRACT

A refeed block for refeeding a displaced edge of a roll-up door into the rail of a refeed assembly. The refeed block has two guide blocks placed at an angle to one another and each has a low coefficient of friction such that the lateral edge of the roll-up door can glide over the guide block with virtually no drag from the guide block.

18 Claims, 5 Drawing Sheets

(56) References Cited

U.S. PATENT DOCUMENTS

| | | | | |
|---|---|---|---|---|
| 2014/0345812 | A1* | 11/2014 | Casey | E06B 9/13<br>160/405 |
| 2019/0048658 | A1* | 2/2019 | Garcia Hernandez | E06B 9/44 |
| 2020/0149346 | A1* | 5/2020 | Solomaniuck | A47H 23/01 |
| 2022/0195796 | A1* | 6/2022 | Zimmermann | E06B 9/58 |
| 2023/0250692 | A1* | 8/2023 | Seshasai | E06B 9/581<br>160/272 |

* cited by examiner

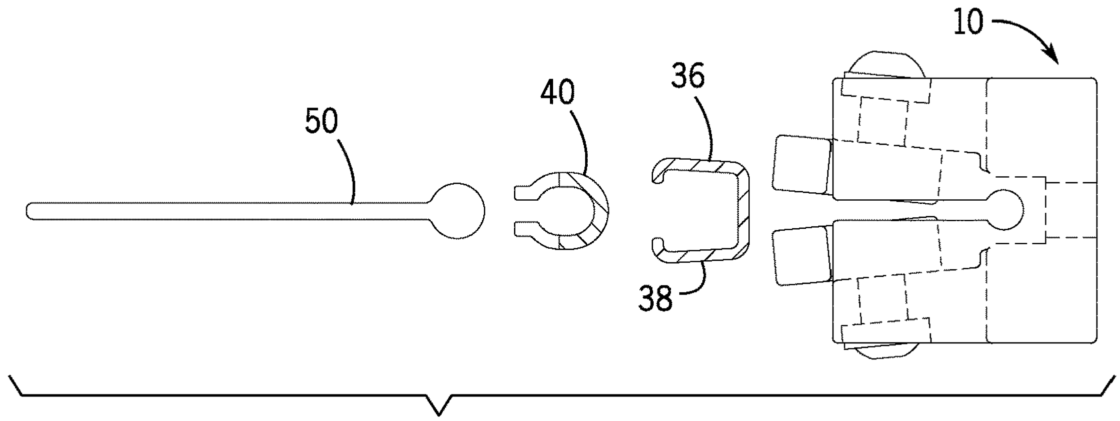
FIG. 13
FIG. 14
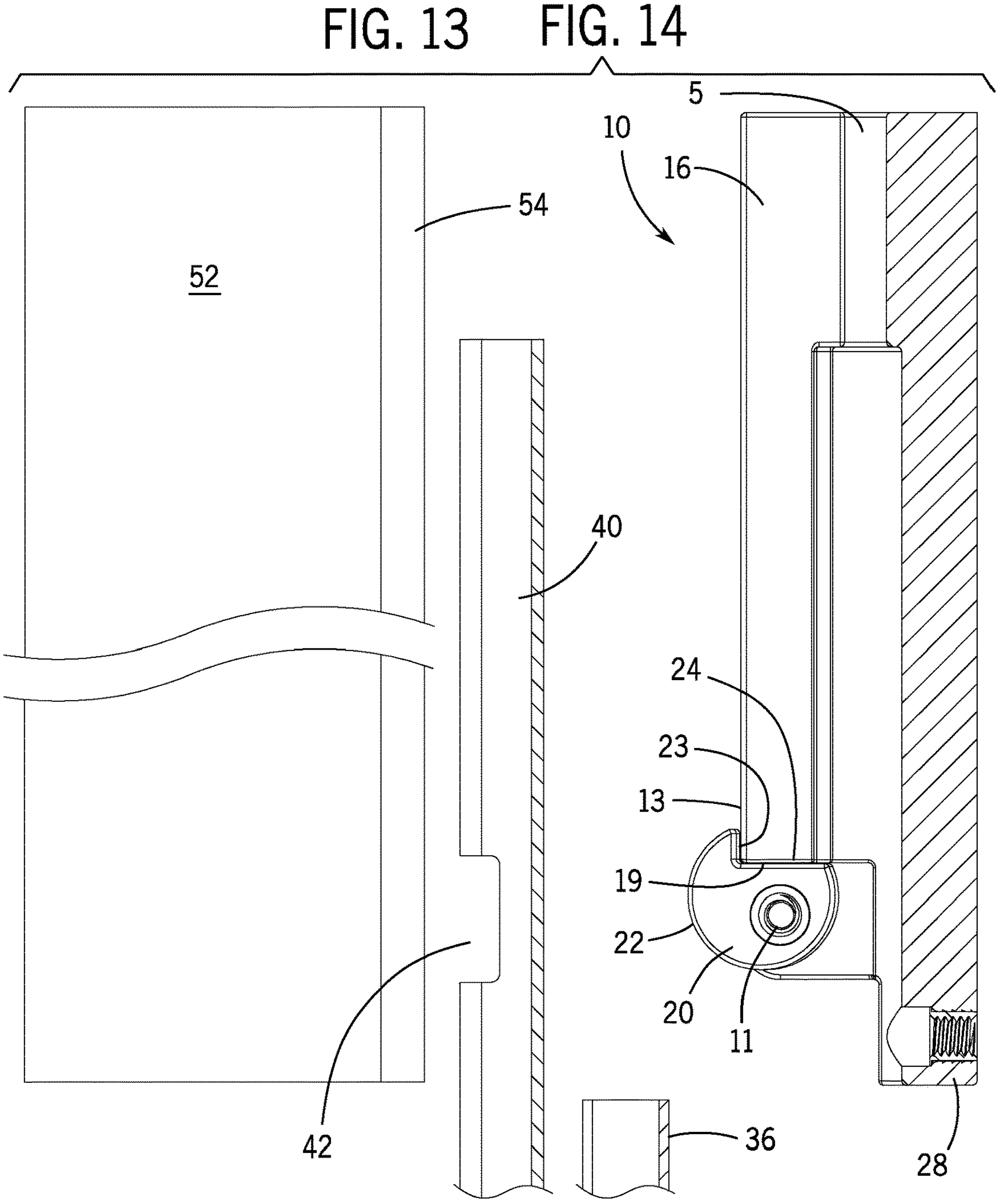

REFEED STRUCTURE AND ROLL-UP DOOR ASSEMBLY

This application claims the benefit of and priority to U.S. Provisional Patent Application No. 63/467,398 filed on May 18, 2023.

FIELD OF THE INVENTION

The present invention relates generally to flexible doors of the type that can be quickly rolled upwardly to an "open" position to provide access to a bay or other facility area and then be quickly rolled downwardly to a "closed" position to seal off access to the bay or other facility area as may be desired or required. Such doors are referred to as "roll-up" doors. Rapid opening and closing of such flexible roll-up doors is required in applications where materials must be moved through the doorway from one side of the door to the other while dust and other contaminants are intended to be kept out. Such roll-up doors can be used to prevent contamination when used in relatively sterile environments or where cold air is intended to be retained within a cold storage area, by way of example. In clean rooms of pharmaceutical or other relatively sterile processing facilities, the interior of the facility can be pressurized above ambient such that, when the flexible roll-up door is raised to its "open" position, air will be forced out of the bay or opening and the door can be quickly lowered to its "closed" position without dust or contaminants having entered the bay or opening due to the forced outflow of air. Such doors are typically made of cloth and/or multi-filament PVC coated curtain material, although other materials can be used and in combination therewith.

The invention also relates to such roll-up doors that have flexible edges, such edges projecting laterally from a central portion of the door and being slidably engaged within guideways affixed to opposing vertical side walls of a doorway. The guideways provide a path for optimal performance of the roll-up door so long as the flexible edges of the door are fully engaged and retained within the guideways. However, flexible roll-up doors can and do become disengaged from the guideways for a wide variety of reasons. A portion of the flexible door edge can become disengaged or displaced from the guideway when a perpendicular force is applied to one side or the other of the flexible roll-up door and typically when the roll-up door is in the down or "closed" position. When this happens, the refeed structure and assembly constructed in accordance with the present invention automatically reset the door on every upward cycle. Failure to reengage the flexible edges of the door with the guideways can result in the roll-up door becoming inoperable, jammed and even damaged. As used herein, the words "open" and "closed" have their plain and ordinary meaning.

BACKGROUND OF THE INVENTION

As alluded to above, the proper operation and functionality of a flexible roll-up door depends primarily on the flexible edges of the roll-up door engaging the guideways and remaining in the guideways during opening and closing cycles. However, it is also known that the edges of a roll-up door can become disengaged or displaced from the guideways. In accordance with the present invention, and if the roll-up door becomes displaced from its guideway at any time during the door's cycling, the door will automatically reset on every upward portion of its cycle. In all other uses, the flexible edges should be fully engaged to allow for suitable sealing of the door and proper opening and closing thereof. Also in accordance with the present invention, the refeed or reintroduction structure and the assemblies related to it require no counterweights, spring, belts, wind bars, wind knobs, coil cords or bottom bars.

SUMMARY OF THE INVENTION

In accordance with the present invention, a unique refeed or reintroduction structure is provided such that the edges of the roll-up door can be reintroduced into the guideway when a portion of the edge becomes accidentally disengaged from the guideway due to a force being exerted on one side or the other of the flexible roll-up door prior to the roll-up door being opened, when it is in the process of opening, or when it is in the process of closing. A failure to reengage the flexible edges of the door can result in the roll-up door becoming inoperable, jammed and even damaged.

It is to be understood that the roll-up door of the type that can be used in accordance with the structure and assembly of the present invention may be a one-piece unitary structure made of a single material. It may also be a three-piece unit wherein the flexible door edges are made of one material and are attached to each side of a flexible center portion made of another material. The flexible center portion may also include opaque and transparent sections such that a user on one side of the roll-up door can visualize what is just outside or inside the other side of the door, much like a window.

The reintroduction structure in accordance with the present invention is disposed at the upper part of the guideway which allows the side edge of the roll-up door to be reintroduced into the guideway on every upward cycle. Absent the reintroduction structure, a displaced lateral edge of the roll-up door would have to be reset manually, which is time and labor intensive. Accordingly, an essential object of the present invention is to present a reintroduction structure whereby the side edges of the roll-up door cannot be damaged when a force higher than a predetermined force is exerted on the edge of the roll-up door when it is closed or during its upwards or downwards movement cycle. It is to be noted that the side edge and the door is made of a resilient and deformable shape-memory material. The portion of the guideway that the side edge of the door travels in is likewise made of a resilient and deformable material.

The foregoing and other features of the present invention will be apparent in the detailed description that follows.

BRIEF DESCRIPTION OF THE DRAWINGS

FIGS. 13 and 14 show exploded top and partial side views, respectively, of the assembly configured in accordance with the present invention.

DETAILED DESCRIPTION OF THE INVENTION

Figure 3:
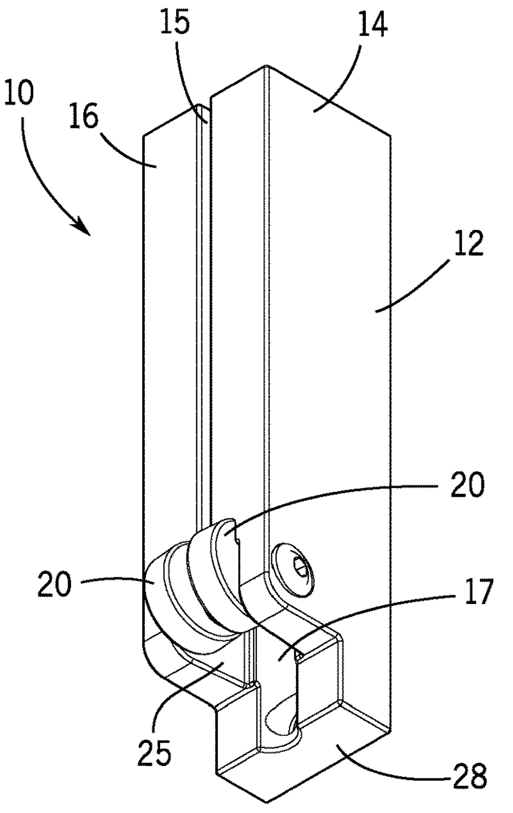
FIG. 3 is a bottom perspective view of the refeed structure built in accordance with the present invention.
Figure 4:
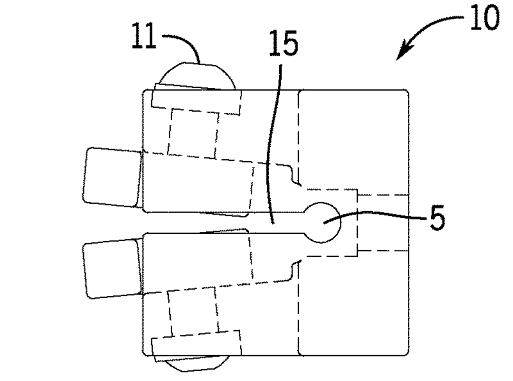
FIG. 4 is a top plan view of the refeed structure shown in FIG. 3.
Figure 5:
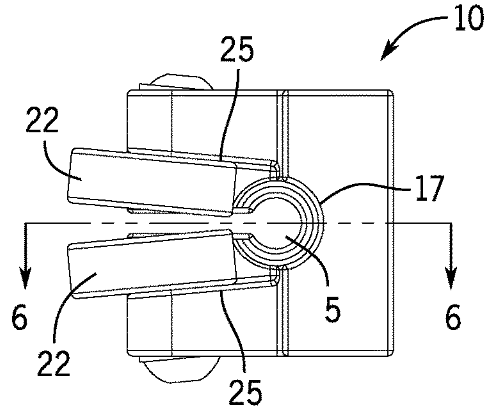
FIG. 5 is a bottom plan view of the refeed structure shown in FIG. 3.

Referring now to the drawings in detail, wherein like-numbered elements refer to like elements throughout, FIG. 3 illustrates a refeed structure, generally identified 10. The refeed structure 10 comprises a refeed housing 12, the housing 12 having a first side 14 and a second side 16. The first side 14 and the second side 16 are separated by a substantially vertical slot 15 having a width and that terminates at a first vertical opening 5 which is disposed within the housing 12, the first vertical opening 5 being cylindrical in shape and having a diameter that is greater than the width of the slot 15. A back portion 18 connects the first side 14 to the second side 16 and a wider cylindrical opening 17 of the housing 12 formed below the first vertical opening 5 and within a bottom portion 28 of the housing 12. FIG. 4 shows a top view of the refeed structure 10 and FIG. 5 shows a bottom view of the refeed structure 10.

Figure 10:
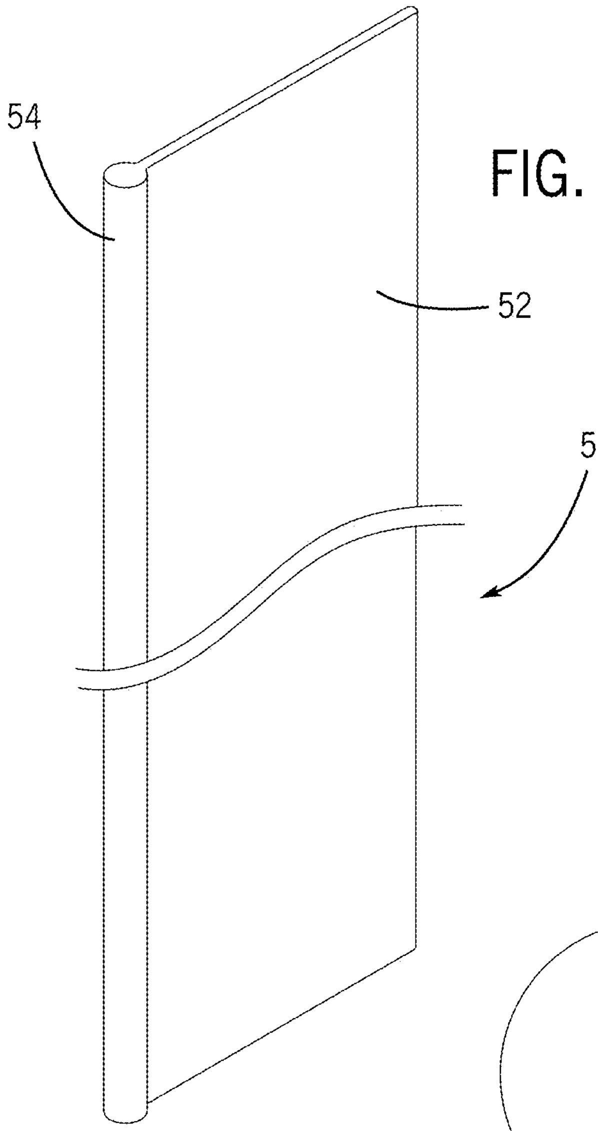
FIG. 10 is a partial perspective view of the roll-up door and a side edge of the roll-up door.
Figure 12:
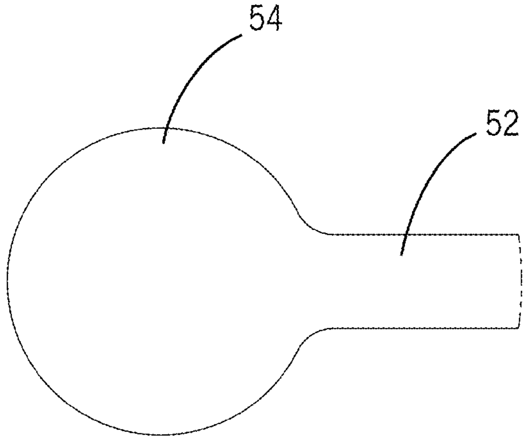
FIG. 12 is a greatly enlarged view of the side edge taken along line 12-12 of FIG. 11.
Figure 11:
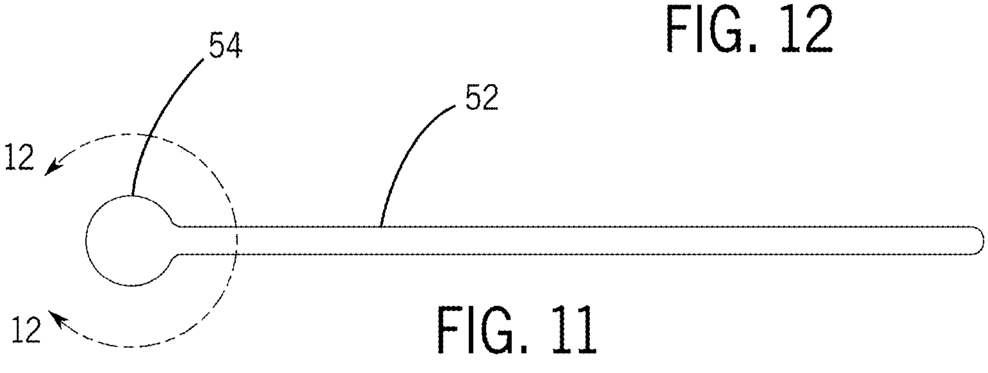
FIG. 11 is a top plan view of the roll-up door and a side edge of the roll-up door shown in FIG. 10.

An exemplar of the roll-up door 50 used in the assembly of the present invention is illustrated in FIGS. 10-12. As shown, the door 50 includes a flat sheet-like panel portion 52 that extends between two side edges 54. FIG. 10 shows the roll-up door 50 in its "closed" position. The roll-up door 50 comprises a unitary structure in this illustrated embodiment which includes the central door panel 52 and one of its lateral edges 54, the other lateral edge not being shown.

Figure 6:
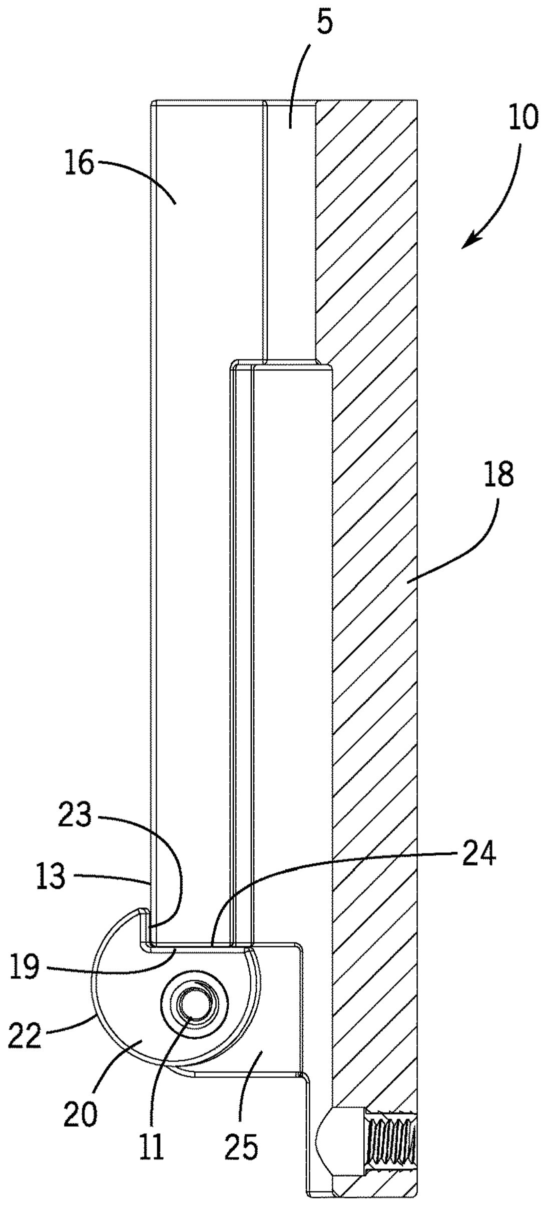
FIG. 6 is a sectioned side elevation view of the refeed structure taken along line 6-6 of FIG. 5.

FIG. 6 is a cross-sectioned view of the refeed structure 10 which shows one of the two guide blocks 20. The particular guide block 20 shown here is secured to the second side 16 of the housing 12. Though shown to be somewhat circular, they are not. The guide blocks 20 do not rotate, nor can they. That is, the guide blocks 20 are "fixed" and immovable structures that allow for the side edge 54 of the roll-up door 50 to slide over them and between them, the guide blocks 20 having a very low coefficient of friction (such as that of a smooth nylon surface) so that the side edge 54 of the roll-up door 50 can glide over the guide blocks 20 with virtually no drag placed on that side edge 54. This facilitates movement of the door edge 54 along any portion of the outer peripheral edge 22 of the roll-up door 50. As used herein, the word "fixed" has its plain and ordinary meaning.

It is to be noted that the opposing guide blocks 20 are placed in a "V-shaped" position and at such an angle that serves to "drive" or "direct" the disengaged side edge 54 of the roll-up door 50 into a rail 40. See FIG. 2. As used herein, the words "drive" and "direct" have their plain and ordinary meaning. Returning to FIG. 6, it shows a front flat 23 of the guide block 20 that is disposed essentially perpendicularly to a top flat 24. Each flat 23, 24 is immovably seated against a surface 13, 19, respectively, of the second side 16 of the housing 12. Where the guide blocks 20 are mounted, the opening is even wider and is defined by the angled sides of the opening 25. Each guide block 20 is anchored to a side 14, 16 of the refeed housing 12 via a fastener 11. The circumferential edge 22 of the guide block 20 is rounded or chamfered.

Figure 1:
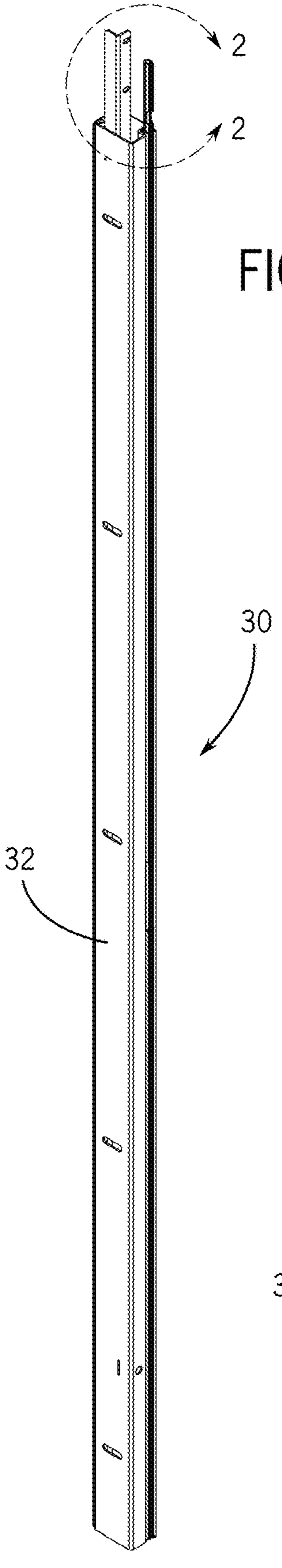
FIG. 1 is a top perspective view of a wall clip of the type used with the refeed structure in accordance with the present invention.
Figure 2:
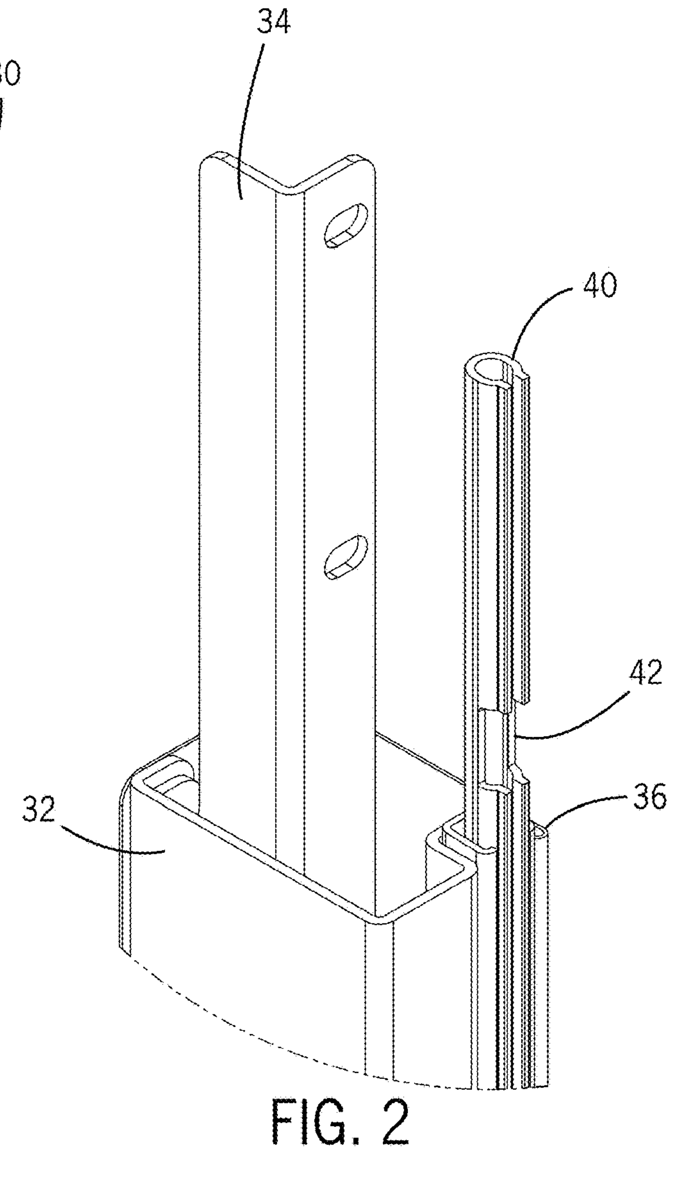
FIG. 2 is an enlarged view of the upper portion of the wall clip taken along line 2-2 of FIG. 1.
Figure 7:
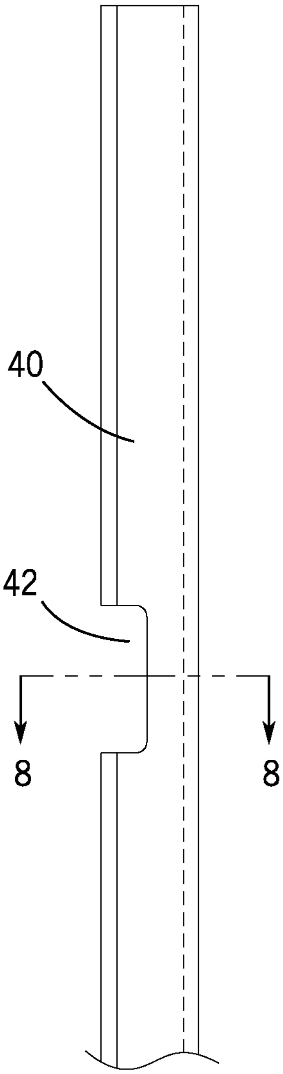
FIG. 7 is a partial side view of the curtain rail shown in FIG. 2.
Figure 8:
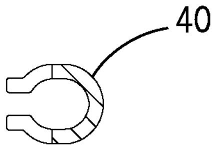
FIG. 8 is a top plan view of the curtain rail shown in FIG. 7.
Figure 9:
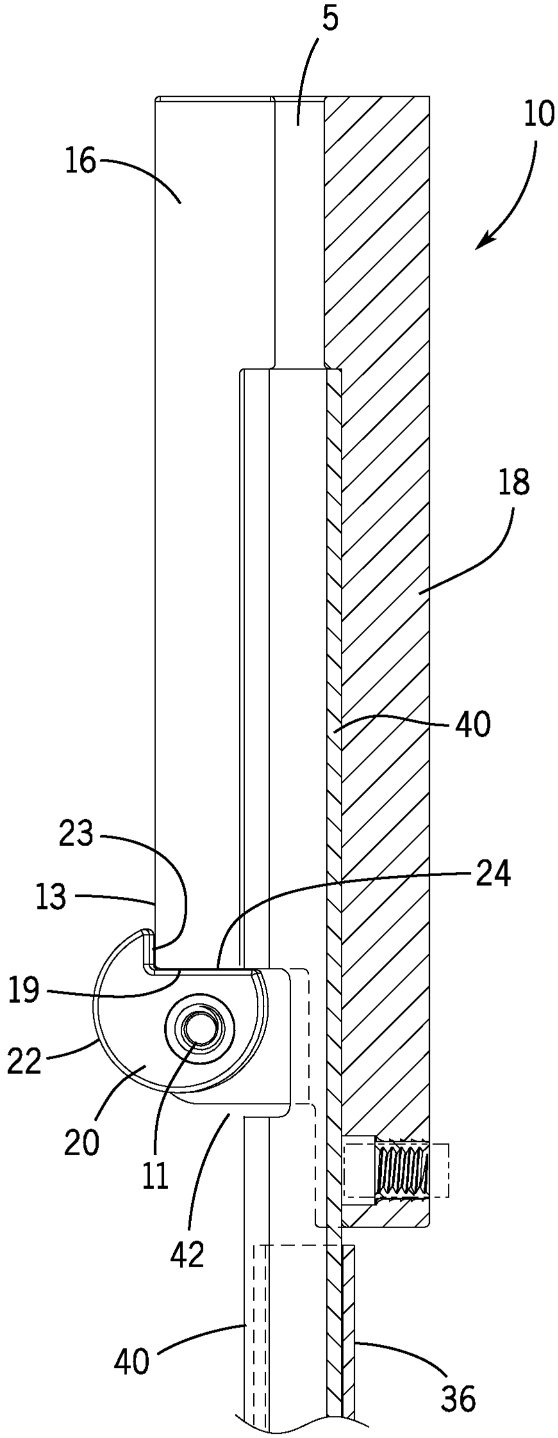
FIG. 9 is a view similar to FIG. 6 and is a sectioned side elevation view showing the refeed structure included.

Referring back to FIGS. 1 and 2, they show a wall clip, generally identified 30, that is anchored to a wall (not shown), such wall being disposed to one side of the doorway or opening. The wall clip 30 comprises a body 32 that is attached to a weldment wall clip 34. Disposed within the body 32 is a face frame slide 36 which further houses the curtain rail 40. The face frame slide 36 is a somewhat squared U-shaped structure having inwardly-extending edges 38. This shape enables the face frame slide 36 to "capture" the rail 40 within it. See FIG. 10. The curtain rail 40 is a horseshoe-shaped structure best shown in FIG. 8. The rail 40, in turn, is configured to retain the side edge 54 of the door 50 within it. The rail 40 further comprises a longitudinal notch 42 as is best shown in FIGS. 2 and 7. The position of the notch 42 of the curtain rail 40 in relation to the refeed structure 10 is best illustrated in FIGS. 2, 4, 5 and 9. As used herein, the word "capture" has its plain and ordinary meaning.

In application, the door 50 starts out in its "closed" position. When a user requires access from one side of the door 50 to the other, the door 50 is actuated to quickly roll upwardly to provide that access. Once fully rolled up, the door 50 is in its "open" position. After the user passes through the doorway, the door 50 is actuated to quickly roll downwardly to reseal the doorway. During these two cycles, the side edge 54 of the door 50 freely passes through and along the rail 40.

If, prior to moving the door 50 to its "open" position, the side edge 54 disengages from the rail 40, the door 50 will still move upwardly. However, at the point where the side edge 54 is disengaged, the side edge 54 will move upwardly toward the notch 42 in the rail 40. As the side edge 54 reaches the notch 42, the side edge 54 will engage the guide blocks 20 of the refeed structure 10. The guide blocks 20 will direct the side edge 54 back into the rail 40 via the notch 42. This will continue for whatever length of side edge 54 there is that needs to be reengaged. Once the door 50 is in its fully "open" position, the side edge 54 of the door 50 will be placed in its proper position. Actuation of the door 50 to move it to its fully "closed" position is thus restored and will remain so unless and until a force is applied to the door 50, which force again disengages a portion of the side edge 54 of the door 50 and the cycle is repeated.

In view of the foregoing, it will be apparent that the present invention provides a unique and novel solution for refeeding a displaced edge 54 of a roll-up door 50 into the rail 40 of a refeed assembly.

We claim:

1. A refeed structure for use with a roll-up door comprising:

a refeed housing, the housing having a front face, a first side, a second side, and a bottom;

a substantially vertical slot defined in the housing, the slot separating the first housing side from the second housing side, the slot having a width and extending from the front face of the housing to a point in the housing and terminating at a bottom point of the housing;

a substantially vertical first opening defined in the housing, the first opening being cylindrical in shape running vertically at the point in the housing where the slot ends and, at such end, the first opening has a diameter that is greater than the width of the slot;

a vertical second opening defined in the housing, the second opening disposed at the bottom of the housing and forming acutely angled V-shaped structure diverging away from a vertical plane from the first opening and having opposing surfaces; and a pair of immovable guide blocks, one of the guide blocks fastened to one of the surfaces of the second opening and one of the guide blocks fastened to the opposing surface.

2. The refeed structure of claim 1 further comprising a back portion connecting the first housing side to the second housing side to form a unitary structure.

3. The refeed structure of claim 1 further comprising guide block fasteners that fasten the guide blocks to each of surfaces of the second opening from points outside the housing.

4. The refeed structure of claim 1 wherein an outer surface of each of the guide blocks comprises a rounded circumferential edge.

5. The refeed structure of claim 4 wherein the circumferential edge of each of the guide blocks is chamfered.

6. The refeed structure of claim 4 wherein each of the guide blocks has a low coefficient of friction.

7. A refeed structure for use with a roll-up door, the roll-up door comprising a central door panel flanked by two lateral edges, the refeed structure comprising:

a refeed housing, the housing having a front face, a first side, a second side, and a bottom;

a substantially vertical slot defined in the housing, the slot separating the first housing side from the second housing side, the slot having a width and extending from the front face of the housing to a point in the housing and terminating at a bottom point of the housing, the vertical slot further being configured to receive one of the lateral edges and a portion of the central door panel nearest the lateral edge;

a substantially vertical first opening defined in the housing, the first opening being cylindrical in shape and running vertically at the point in the housing where the slot ends and having a diameter that is greater than the width of the slot, the first opening being configured to receive one of the lateral edges of the roll-up door;

a vertical second opening defined in the housing, the second opening disposed at the bottom of the housing and forming acutely angled V-shaped structure diverging away from a vertical plane from the first opening and having opposing surfaces; and a pair of immovable guide blocks, one of the guide blocks fastened to one of the surfaces of the second opening and one of the guide blocks fastened to the opposing surface, the guide blocks being configured to allow one of the lateral edges and the portion of the central door panel nearest the lateral edge to pass between them and to urge the portion of the lateral edge into the slot and first opening when the roll-up door is traveling upwardly.

8. The refeed structure of claim 7 further comprising a back portion connecting the first housing side to the second housing side to form a unitary structure.

9. The refeed structure of claim 7 further comprising guide block fasteners that fasten the guide blocks to each of the surfaces of the second opening from points outside the housing.

10. The refeed structure of claim 7 wherein an outer surface of each of the guide blocks comprises a rounded circumferential edge.

11. The refeed structure of claim 10 wherein the circumferential edge of each of the guide blocks is chamfered.

12. The refeed structure of claim 7 wherein each of the guide blocks has a low coefficient of friction such that the lateral edge of the roll-up door can glide over the guide block with virtually no drag from the guide block.

13. A refeed structure and roll-up door assembly comprising:

a pair of vertically extending and opposing wall clips, each of the wall clips being disposed to one side of a doorway and each of the wall clips comprising a face frame slide, the face frame slide extending upwardly to a first point;

a rail disposed within each wall clip, the rail extending upwardly to a second point and each of the rails comprising a notch disposed at a third point;

a roll-up door, the roll-up door comprising a central door panel flanked by two lateral edges;

a refeed housing, the housing having a front face, a first side, a second side, and a bottom, the refeed housing being located at and extending above the third point where the notch is disposed within the rail;

a substantially vertical slot defined in the housing, the slot separating the first housing side from the second housing side, the slot having a width and extending from the front face of the housing to a point in the housing and terminating at a bottom point of the housing, the vertical slot further being configured to receive one of the lateral edges and the portion of the central door panel nearest the lateral edge;

a substantially vertical first opening defined in the housing, the first opening being cylindrical in shape and running vertically at the point in the housing where the slot ends and having a diameter that is greater than the width of the slot, the first opening being configured to receive one of the lateral edges of the roll-up door;

a vertical second opening defined in the housing, the second opening disposed at the bottom of the housing and forming acutely angled V-shaped structure diverging away from a vertical plane from the first opening and having opposing surfaces; and a pair of immovable guide blocks disposed just above the third point where the notch is disposed within the rail, one of the guide blocks being fastened to one of the surfaces of the second opening and one of the guide blocks being fastened to the opposing surface, the guide blocks being configured to allow a lateral edge and a portion of the central door panel nearest the lateral edge to pass between them and to urge the portion of the lateral edge into the slot and first opening when the roll-up door is traveling upwardly;

wherein a disengaged portion of the lateral edge of the roll-up door can be reintroduced to the rail by passing through the notch in the rail, then between the guide blocks and then back into the rail when the roll-up door is travelling upwardly.

14. The refeed structure and roll-up door assembly of claim 13 wherein the refeed structure further comprises a back portion connecting the first housing side to the second housing side to form a unitary structure.

15. The refeed structure and roll-up door assembly of claim 13 wherein the refeed structure further comprises guide block fasteners that fasten the guide blocks to each each of the surfaces of the second opening from points outside the housing.

16. The refeed structure and roll-up door assembly of claim 13 wherein an outer surface of each of the guide blocks comprises a rounded circumferential edge.

17. The refeed structure and roll-up door assembly of claim 16 wherein the circumferential edge of each of the guide blocks is chamfered.

18. The refeed structure and roll-up door assembly of claim 16 wherein each of the guide blocks has a low coefficient of friction such that the lateral edge of the roll-up door can glide over the guide block with virtually no drag from the guide block.

* * * * *